(12) United States Patent
Santos

(10) Patent No.: US 9,967,262 B1
(45) Date of Patent: May 8, 2018

(54) ACCOUNT VERIFICATION BASED ON CONTENT SUBMISSION

(71) Applicant: Amazon Technologies, Inc., Seattle, WA (US)

(72) Inventor: Jose Dario Santos, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 149 days.

(21) Appl. No.: 15/064,434

(22) Filed: Mar. 8, 2016

(51) Int. Cl.
*H04L 29/06* (2006.01)
*G06K 7/14* (2006.01)

(52) U.S. Cl.
CPC .......... *H04L 63/126* (2013.01); *G06K 7/1417* (2013.01)

(58) Field of Classification Search
CPC .................................................... H04L 63/126
See application file for complete search history.

(56) References Cited

U.S. PATENT DOCUMENTS

| | | | | |
|---|---|---|---|---|
| 8,577,810 B1* | 11/2013 | Dalit | ........................ | G06F 21/32 705/1.1 |
| 9,485,237 B1* | 11/2016 | Johansson | ................ | H04L 63/08 |
| 2009/0165104 A1* | 6/2009 | Danielsen | ................ | G06F 21/41 726/6 |
| 2010/0023643 A1* | 1/2010 | Torii | ................... | H04L 41/0213 709/232 |
| 2010/0211648 A1* | 8/2010 | Bhagat | ................ | H04L 12/5885 709/206 |
| 2013/0286161 A1* | 10/2013 | Lv | ....................... | G06K 9/00214 348/46 |
| 2014/0196110 A1* | 7/2014 | Rubinstein | .............. | H04L 63/08 726/3 |
| 2014/0270411 A1* | 9/2014 | Shu | ....................... | G06K 9/6211 382/118 |
| 2015/0278619 A1* | 10/2015 | Pakhchanian | ........ | G06K 9/6263 382/310 |
| 2015/0288704 A1* | 10/2015 | Huang | .................... | G06F 21/64 726/4 |
| 2015/0341370 A1* | 11/2015 | Khan | ...................... | H04L 63/20 726/30 |
| 2016/0055327 A1* | 2/2016 | Moran | .................... | G06F 21/32 726/19 |
| 2016/0321446 A1* | 11/2016 | Rouse | .................... | H04L 63/10 |

* cited by examiner

*Primary Examiner* — Ali Shayanfar
(74) *Attorney, Agent, or Firm* — Kilpatrick Townsend & Stockton LLP

(57) ABSTRACT

This disclosure is directed to a platform for providing automated verification of a service provider account based on content provided in relation to the account. In some embodiments, a code is generated by the service provider and transmitted to an account holder. The code is then embedded in a media file, which is received at the service provider. Once received, the service provider identifies the account based on the embedded code and subjects the media file to a series of verification processes. Each verification process to which the image is subjected may contribute to a total confidence level associated with the account. In some embodiments, the media file continues to be subjected to verification processes until the total confidence level exceeds a minimum confidence threshold.

16 Claims, 6 Drawing Sheets

US 9,967,262 B1

ACCOUNT VERIFICATION BASED ON CONTENT SUBMISSION

BACKGROUND

As internet use becomes increasingly prevalent in our society, it is becoming more and more important for each individual to maintain an internet presence. However, the ease with which users are able to open accounts with service providers, paired with the sheer volume of those accounts being opened at any given time, make it difficult to determine whether a requestor of an account is who he or she claims to be. At the very least, this makes a determination of fraud difficult for any service provider. However, even when there is no risk of fraud (e.g., when the account does not provide access to a resource that can be acquired), accounts are often created in the name of celebrities and other famous individuals. Without a means of authenticating accounts, other account holders may find it difficult to believe that an account is truly associated with the person with which the account is claimed to be associated.

BRIEF DESCRIPTION OF THE DRAWINGS

Various embodiments in accordance with the present disclosure will be described with reference to the drawings, in which.

DETAILED DESCRIPTION

Figure 1:
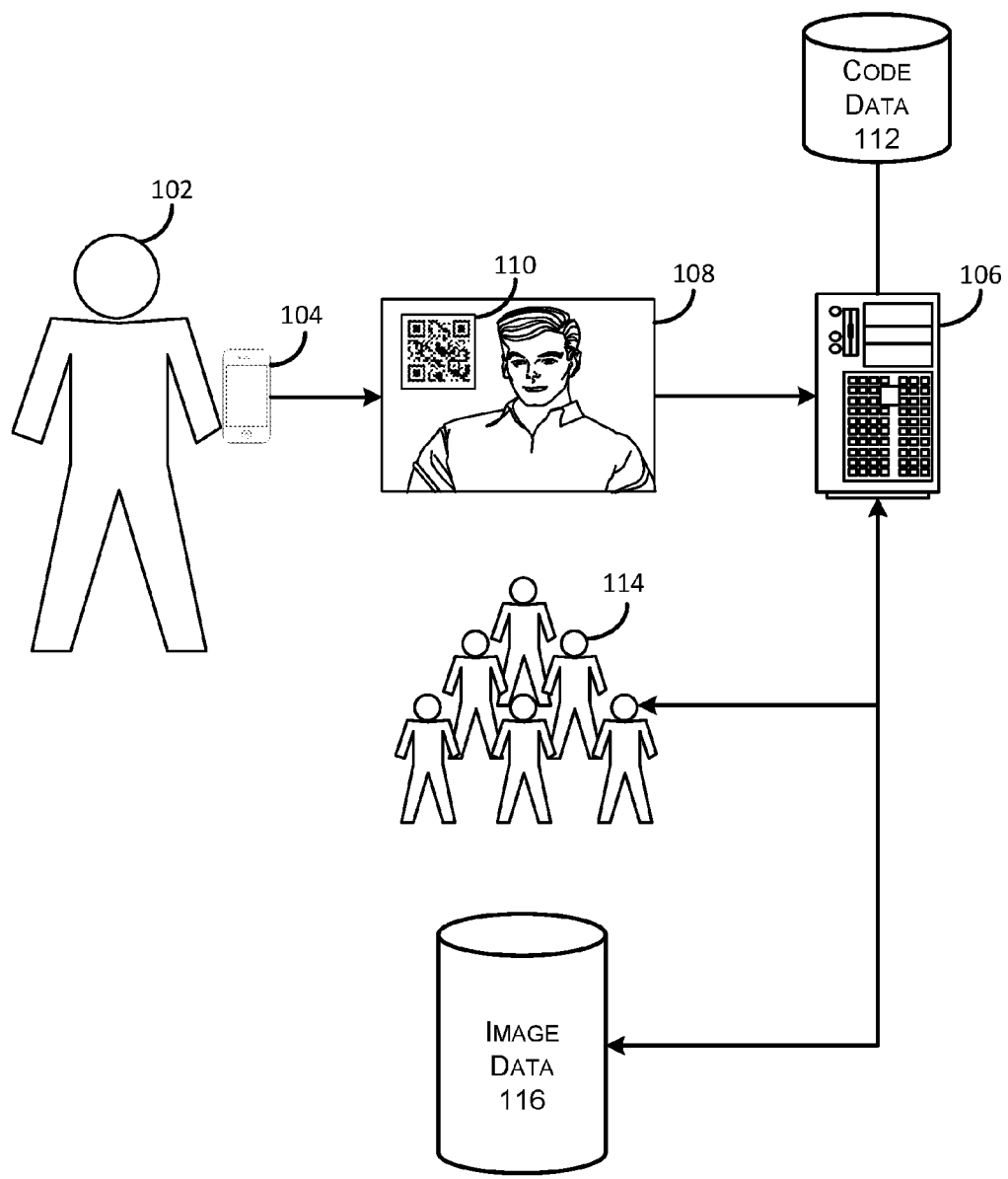
FIG. 1 depicts an illustrative example of a user interaction with the disclosed platform in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include a platform for verifying and ensuring authenticity of a user account. In some embodiments, a user may submit, to a service provider computer, an image that includes a unique code. The unique code may be utilized by the service provider computer to identify an account associated with the image. Once the account is identified, the image may undergo one or more verification techniques until a confidence level associated with the image exceeds a threshold confidence level. Each verification technique may contribute to an overall confidence level.

By way of illustration, a user wishing to verify his or her identify may request a unique code from the service provider. Upon receiving the code, the user may include the received code within an image. Once the service provider computer receives the image from the user, an account associated with the image may be identified based on the unique code. Once the account has been identified, the service provider may determine one or more verification techniques to be used to authenticate the identity of the user that submitted the image. For example, the image may be subjected to a crowdsourcing or community verification process, in which a community is given the ability to authenticate the image. The results of the community verification process may then be combined with the results of other verification techniques to create a confidence level to be associated with the image. The service provider computer may determine if the confidence level is greater than a predetermined threshold value. If the confidence level is below the predetermined threshold value, then the service provider computer may submit the image to a second verification technique. In some embodiments, the predetermined threshold may be calculated based on the user that submitted the image.

In some embodiments, a media file received at a service provider may be linked to an account to which it is associated. It may be subjected to one or more verification processes and may be assessed to determine if a confidence level associated with the media file exceeds a confidence threshold. If the confidence level is determined to exceed a minimum confidence threshold, then an account associated with the media file may be verified. In some embodiments, the service provider may subject the media file to one or more verification processes during a verification period. In some embodiments, if the verification period has elapsed and a confidence level associated with the media file has not exceeded the minimum confidence level, then the account fail the verification process.

FIG. 1 depicts an illustrative example of a user interaction with the disclosed platform in accordance with at least some embodiments. In FIG. 1, a user 102 may request, via a user device 104, a unique code to be associated with an account of the user from a service provider computer 106. In some embodiments, the service provider computer may maintain a number of user accounts, each associated with a different user. Upon receiving the unique code, the user may capture and submit an image 108 that includes an image of the code 110.

Upon receiving the image 108 that includes the code 110, the service provider 106 may utilize one or more image processing techniques to determine an account number associated with the code. For example, the image of the code may be an image of a machine readable code and the image processing technique may be utilized to read an account number embedded in the machine readable code. In some embodiments, the code may be a barcode or other two-dimensional code such as a quick response (QR) code. In some embodiments, the code may be a number or a string of text. In some embodiments, the code may be a metadata tag attached to the image via an account authentication module as described below. The service provider computer may access a database of code data 112 to determine which account that the code is associated with.

Once the image has been associated with a user account, the image may undergo one or more verification techniques to validate its authenticity. For example, the image may be submitted to a user community 114, which is able to vote or otherwise provide feedback regarding the authenticity of the image 110. In another example, the image may be compared to one or more images in an image database 116. In some embodiments, one or more image processing techniques may be used to compare various images to the submitted image. For example facial recognition techniques may be utilized to compare a facial structure from the image to facial structures in other images stored with respect to various people.

In some embodiments, an amount of confidence may be calculated via each verification technique utilized on the submitted image. In some embodiments, the generated confidence may be summed into a total confidence level that the image is authentic. In some embodiments, the total confidence may be estimated as the highest confidence determined from each of the verification techniques. In some embodiments, the total confidence level may be a percentage. For example, the service provider computer may estimate a 70% confidence level using a crowdsourcing verification technique and a 90% confidence level using an image comparison technique. In this example, the service provider computer may assign a total confidence level of 90% to the image based on that confidence being the highest level of confidence achieved for the image. In some embodiments, the confidence level may be a value or an amount. For example, the service provider computer may estimate a confidence level of 85 using a crowdsourcing verification technique and a confidence level of 75 using an image comparison technique. In this example, the service provider computer may assign a total confidence level of 160 (the sum of the two verification confidence levels) to the image. In this example, the service provider may determine that a minimum confidence threshold required for authentication of this user is 150. The service provider may subsequently indicate that the image (and the account associated with the image) is verified based on the total confidence level of the image being greater than the confidence threshold.

Figure 2:
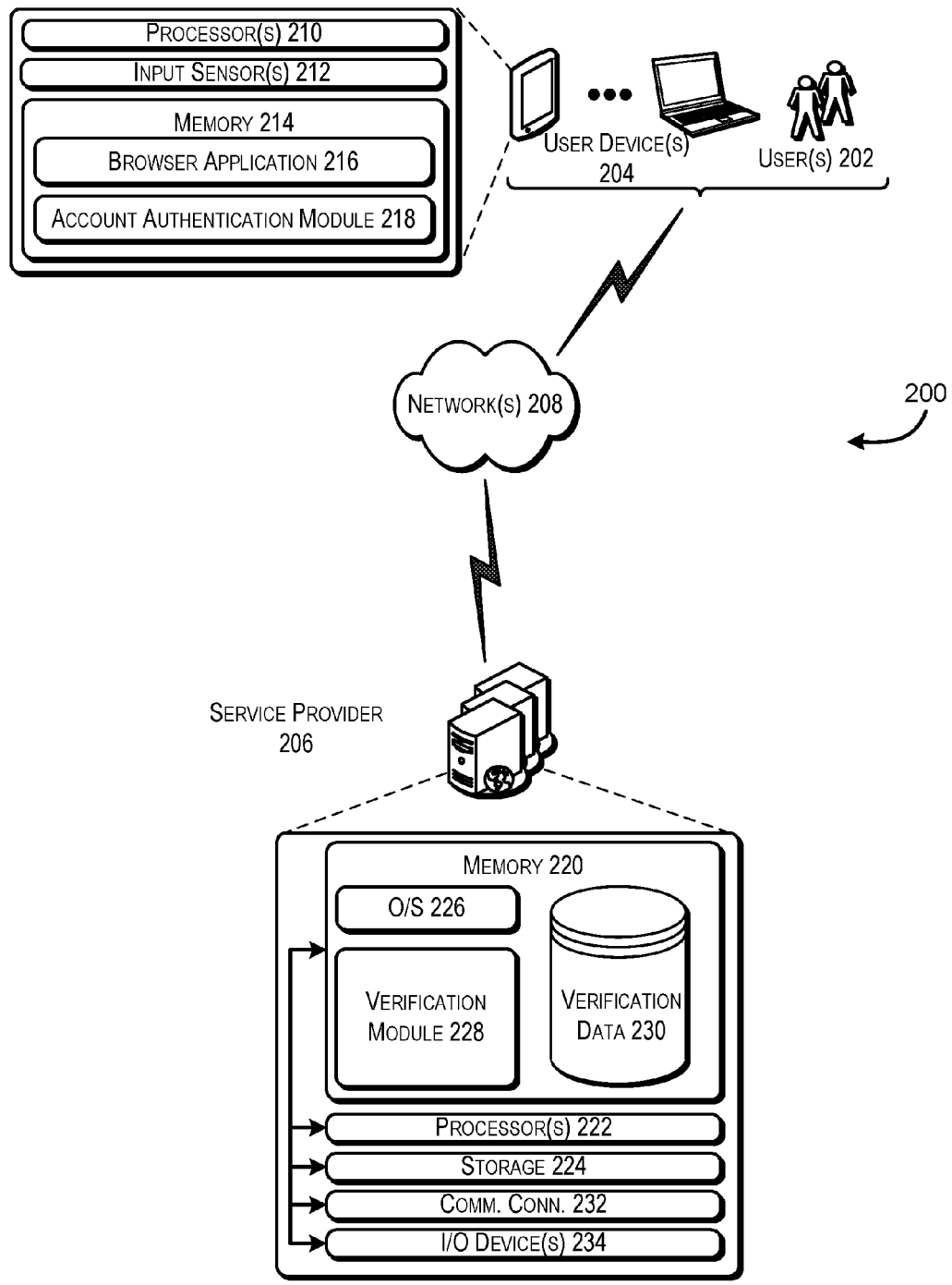
FIG. 2 depicts an illustrative example of a system or architecture in which techniques for authenticating a user account may be implemented.

FIG. 2 depicts an illustrative example of a system or architecture 200 in which techniques for authenticating a user account may be implemented. In architecture 200, one or more consumers and/or users 202 may utilize user devices 204. In some examples, the user devices 204 may be in communication with a service provider 206 via the network(s) 208, or via other network connections.

The user devices 204 may be any type of computing device such as, but not limited to, a mobile phone, a smart phone, a personal digital assistant (PDA), a laptop computer, a desktop computer, a server computer, a thin-client device, a tablet PC, etc. In some embodiments, a user device may be a voice controlled speaker system. Additionally, user devices 204 may be any type of wearable technology device, such as a watch, earpiece, glasses, etc. The user device 204 may include one or more processors 210 capable of processing user input. The user device 204 may also include one or more input sensors 212 for receiving user input. As is known in the art, there are a variety of input sensors 212 capable of detecting user input, such as accelerometers, cameras, microphones, etc. The user input obtained by the input sensors may be from a variety of data input types, including, but not limited to, audio data, visual data, or biometric data. Embodiments of the application on the user device 204 may be stored and executed from its memory 214.

Turning to the contents of the memory 214 in more detail, the memory 214 may include a browser application 216. The memory 214 may also include an account authentication module 218 that is capable of capturing an image to be provided to the service provider 206. Although sample architecture 200 depicts an account authentication module 218 as being included in the contents of the memory 214 of the user device 204, some embodiments may not include an account authentication module 218 in memory 214 of the user device 204. In those embodiments in which the account authentication module 218 is not included in memory 214, input received by the input sensors 212 may instead be processed by the service provider 206. This will be described in detail below.

In some embodiments, the account authentication module 218 may be configured to capture an image that includes a code and transmit that image to the service provider. In some embodiments, the account authentication module 218 may be a software application installed on, and executed from, the user device 204, and may utilize a camera device of the user device 204 to capture the image. In some embodiments, the account authentication module may be configured to capture a live image from the camera device and stream that image to the service provider. This may be done to ensure that the image has not been edited prior to its submission to the service provider 206. In some embodiments, the account authentication module 218 may be configured to allow a user to upload a photo from the memory 214 of the user device 204. In some embodiments, the account authentication module 218 may be configured to receive the code from the service provider computer and embed that code into a captured image. For example, the account authentication module 218 may receive a code from the service provider computer in response to a request made by a user. The account authentication module 218 may activate a camera of the user device in order to capture an image. Upon capturing an image, the account authentication module may subsequently embed the code into the image. For example, the account authentication module 218 may append the code to a metadata for the image and transmit the image to the service provider 206. In some embodiments, the code may be encrypted by the account authentication module 218. In another example, the account authentication module may overlay at least a portion of the image with a machine readable code. In some embodiments, the account authentication module may utilize one or more facial recognition techniques to identify a space within the image that does not include facial data. The account authentication module 218 may be configured to embed the image with a machine readable code at that space within the image.

In some examples, the network(s) 208 may include any one or a combination of many different types of networks, such as cable networks, the Internet, wireless networks, cellular networks, and other private and/or public networks. While the illustrated example represents the users 202 accessing the service provider 206 via browser application 216 over the network(s) 208, the described techniques may equally apply in instances where the users 202 interact with a service provider 206 via the user device 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

As described briefly above, the browser application 216 may allow the users 202 to interact with a service provider 206, such as to store, access, and/or manage data, develop and/or deploy computer applications, and/or interact with web content. The one or more service providers 206, perhaps arranged in a cluster of servers or as a server farm, may be configured to host a website (or combination of websites) viewable via the user device 204 or a web browser accessible by a user device 204 via the browser application 216.

Although depicted in memory of the user device 204 in this example, in some embodiments the browser application 216 may be hosted at a server. For example, the user device 204 may be a thin client device capable of accessing a browser application 216 remotely. The browser application 216 may be capable of handling requests from many users 202 and serving, in response, various user interfaces that can be rendered at the user device 204 such as, but not limited to, a web site. The browser application 216 may be any type of application or interface that supports user interaction with a website, including those with user interaction, such as social networking sites, electronic retailers, informational sites, blog sites, search engine sites, news and entertainment sites, and so forth. As discussed above, the described techniques can similarly be implemented outside of the browser application 216, such as with other applications running on the user device 204.

The service provider 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 206 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider 206 may include at least one memory 220 and one or more processing units (or processor(s)) 222. The processor(s) 222 may be implemented as appropriate in hardware, computer-executable instructions, firmware or combinations thereof. Computer-executable instruction or firmware implementations of the processor(s) 222 may include computer-executable or machine executable instructions written in any suitable programming language to perform the various functions described.

The memory 220 may store program instructions that are loadable and executable on the processor(s) 222, as well as data generated during the execution of these programs. Depending on the configuration and type of service provider 206, the memory 220 may be volatile (such as random access memory (RAM)) and/or non-volatile (such as read-only memory (ROM), flash memory, etc.). The service provider 206 may also include additional storage 224, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 220 may include multiple different types of memory, such as static random access memory (SRAM), dynamic random access memory (DRAM) or ROM. Turning to the contents of the memory 220 in more detail, the memory 220 may include an operating system 226 and one or more application programs or services for implementing the features disclosed herein including at least a module for verifying an image's authenticity (verification module 228). The memory 220 may also include verification data 230, which provides information related to account verification. In some embodiments, the verification data 230 may be stored in a database.

The memory 220 and the additional storage 224, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 204 or the service provider 206. The service provider 206 may also contain communications connection(s) 232 that allow the service provider 206 to communicate with a stored database, another computing device or server, user terminals, and/or other devices on the network(s) 208. The service provider 206 may also include input/output (I/O) device(s) and/or ports 234, such as for enabling connection with a keyboard, a mouse, a pen, a voice input device, a touch input device, a display, speakers, a printer, etc.

Turning to the contents of the memory 220 in more detail, the memory 220 may include an operating system 226, a database containing verification data 230 and the one or more application programs or services for implementing the features disclosed herein, including a verification module 228.

In some embodiments, the verification module 228 may be configured to receive image data from the account authentication module 218 and determine a confidence level to be associated with the image. In some embodiments, the verification module 228 may be configured to accept only images captured using the account authentication module 218 on a user device 204. In some embodiments, the verification module 228 may be configured to receive streaming image information. The verification module may utilize one or more image processing techniques to identify various structures from the received image. For example, the verification module 228 may identify a code embedded in the image, such as via a machine readable code or a metadata tag. The verification module 228 may be configured to identify the code from the embedded information. In some embodiments, the verification module 228 may be configured to scan a machine readable code located within the image. In some embodiments, the verification module 228 may be configured to decrypt metadata information in order to identify the code. Once the verification module has identified the code associated with the image, the verification module 228 may determine an account that the code is associated with. For example, a user 202 may submit a request for authentication with respect to a particular account and a code may be generated and transmitted to that user that is related to that account. In this example, the code may be utilized by the verification module 228 to identify that account that should be verified. Once the account has been identified, the verification module 228 may submit the image to one or more verification techniques as described below with respect to FIG. 3.

In some embodiments, verification data 230 may include one or more media databases. For example, the verification data 230 may include a database of images. In another example, the verification data 230 may include a database of audio clips. Verification data 230 may be predetermined or it may be dynamically generated. For example, the verification data 230 may be compiled upon receiving a request for authentication of an account. In this example, a compilation of image information related to a particular person or subject may be generated using images available from one or more third party entities (entities unaffiliated with the service provider 206).

Figure 3:
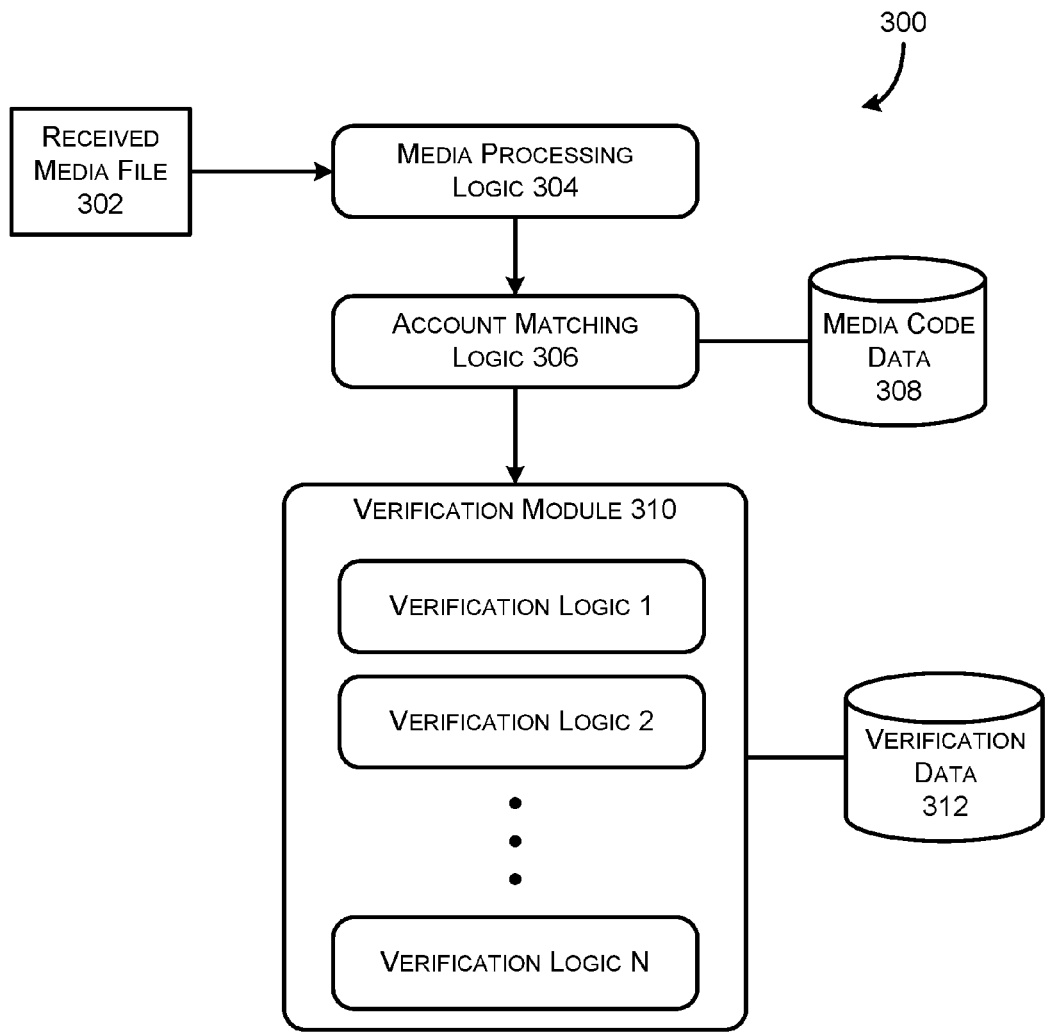
FIG. 3 depicts an example data flow to be carried out by a service provider when providing an account verification in accordance with at least some embodiments.

FIG. 3 depicts an example data flow to be carried out by a service provider when providing an account verification in accordance with at least some embodiments. In some embodiments, data flow 300 may be performed by an example of the service provider 206 depicted in FIG. 2.

In some embodiments, a media file 302 may be received at a service provider computer. Upon receipt of the media file 302, the service provider may subject the received media file to a media processing logic 304. The media processing logic 304 may be any program, module, or other set of instructions configured to identify particular pieces of information from the media file 302. For example, in some embodiments the media file 302 may be an image and the media processing logic may be an image processing technique. In this example, an image may be scanned in order to identify a code within the image as well as any potential facial structures within the image. Although the disclosure focuses on image files, the media file 302 may include an image, a video, an audio sample, or any other suitable type of media. The media file may include one or more metadata associated with the file itself. For example, the media file may include a date upon which the media file was generated and/or edited in a metadata of the media file. In another example, the media file may include location information indicating a location at which the media file was generated in a metadata of the media file. In some embodiments, a code may be included in the metadata of the media file. The code may be encrypted or otherwise encoded.

In some embodiments, the service provider may utilize an account matching logic 306 to identify an account associated with the media file. In account matching logic 306, the service provider may, upon receiving an indication of the code associated with the image, query a media code database 308 to identify an account associated with the code. In some embodiments, a user may log into an account maintained by the service provider and may request verification of his or her account. A unique code may be generated at that time in relation to the user account that the user was logged into. The code may be stored in the media code data 308 along with an indication of the account. For example, the code and the account may be stored as values in two separate columns within a single row of a database table.

In some embodiments, a minimum confidence level may be determined for an account. The minimum confidence level may be calculated based on a likelihood that the user is who they claim to be. In some embodiments, the minimum confidence level may be lower if the user has been an account holder for longer. For example, a newly created account may require that a greater confidence level be met than an older account. In some embodiments, an account associated with a famous individual may require a higher minimum confidence level than an account associated with an unknown individual. The service provider may calculate a level of fame for a particular individual. In some embodiments, a level of fame may be calculated such that it is proportional to a number of search results returned by an internet search for that individual. In some embodiments, a level of fame may be calculated based on a number of websites that link to a webpage associated with the individual. In some embodiments, a level of fame may be determined based on a number of unique views of a content published by the individual. In some embodiments, a combination of the above referenced factors may be included in a calculation of a minimum confidence level for an individual. A minimum confidence level may have a minimum or maximum value.

In some embodiments, the service provider may submit the media file to a verification module 310. The verification module 310 may be configured to generate a confidence level to be associated with the media file 302. In some embodiments, the verification module 310 may be an example verification module 228 of FIG. 2. In some embodiments, the verification module 310 may comprise a number of verification techniques (verification logic 1-N). For example, the verification module 310 may utilize multiple methods of verifying the authenticity of an account via the media file. In some embodiments, the service provider may submit the media file to a subset of the set of verification logic. The subset to which the media file is submitted may be determined based on a type of media file being verified, a minimum confidence threshold associated with the account, a number of search results returned by an internet search related to an account holder, or any other suitable account-related information. In some embodiments, the verification module 310 may have access to a database of information that may be used in a verification process, such as verification data 312. In some embodiments, verification data 312 may be an example verification data 230 of FIG. 2.

One example verification logic may include logic for verifying that the media file is genuine. For example, a date of generation included in the metadata associated with the media file may be compared to a date upon which the code was generated. If, in this example, the media file was created before the code was generated then the verification logic may determine that the media file may have been edited to include the code (as the code could not have been included in the original media file). The verification logic may then determine that the media file is likely forged based on this analysis. In another example, the verification logic may determine that the media file was not generated using an account authentication module as described with respect to FIG. 2 in embodiments which employ such a module. In this scenario, the service provider may reject the image completely, or it may assign a very low confidence level to the media file upon determining that it was not properly captured/submitted.

Another example verification logic may include logic for utilizing a crowdsourcing platform, or other user community based platform, to verify that the media file is likely authentic. In this verification technique, the media file may be presented to one or more users in a community of users. In some embodiments, the service provider may present the media file to users that are familiar with the account holder to be verified. Users familiar with the account holder may be determined based on a relationship to the account holder. For example, users may be identified based on being family members of the account holder. Users familiar with the account holder may be determined based on a purchase history. For example, the service provider may identify users that recently purchased a piece of art, media, or product associated with the account holder. By way of illustration, if the account holder claims to be a movie star, then the service provider may identify purchasers of a movie that the movie star starred in. In some embodiments, the service provider may identify users that are familiar with the account holder based on internet browsing history. For example, the service provider may identify individuals who have performed an internet search related to the account holder or visited a website related to the account holder in the past. In some embodiments, the service provider may upload the media file to a website associated with the account to be verified (potentially having a pending verification status), which may be opened to the community based platform for viewing. In this case, visitors to the website may be given the opportunity, over a specified time frame, to indicate whether or not they believe the individual to be the account holder. In another example, the media file may be presented to one or more targeted users of the community-based platform. For example, a user may be sent an image uploaded to the service provider to verify an account. The user may then be asked, "Is this X?," where X is the name of the account holder. Some users may answer in the affirmative, some in the negative, and some may indicate that they do not know the answer. In some embodiments, answers from one or more of the users may be used to generate a confidence level. For example, the confidence level may comprise a percentage of the users that answered in the affirmative. In some embodiments, multiple media files from different accounts may be provided to a user of the community based platform. For example, a series of images related to different accounts to be verified may be presented to a user along with the claimed account holder name. In this example, the user may be asked to "swipe right" if a person in the image is the account holder and "swipe left" if it is not. The user may be asked to process each image in a series of images in this fashion. In some embodiments, the media file may only be presented to other users that should have knowledge of the account holder's identity. For example, the media file may be presented to known family members and/or friends (e.g., connections identified via a social networking site) of the account holder. If the account holder is famous, then the media file may be presented to a fan club member or a consumer of the account holder's work. In some embodiments, the service provider may limit those able to participate in the described verification technique to verified members of the community based platform.

Another example verification logic may include logic for comparing the media file to known data. For example, if the media file is an image file related to a famous actor, then the service provider may compare the image to known images of that actor stored in a database. In some embodiments, a set of known images may be generated upon receiving the request. For example, if the service provider receives a request to verify a Mr. A, the service provider may conduct an internet search or a search of another database to identify a collection of images related to Mr. A. In some embodiments, the generated set of images may be filtered to exclude images that are too dissimilar. For example, images that do not include a facial structure may be excluded from the set of known images. In another example, images in which a facial structure is not similar enough to a facial structure in the majority of the other known images may be excluded. In some embodiments, the images may be compared to the set of known images to determine that a facial structure in the submitted image is similar to the facial structure in the known images. In some embodiments, images may be flagged or given a lower confidence value if they are too similar. For example, if the image submitted to the service provider is identical to one of the images in the set of known images, except that it includes a code, then it is likely that the image submitted is an altered version of the known image. Accordingly, the submitted image may be flagged as a potential forgery.

Another example verification logic may include logic for comparing metadata associated with the media file 302 to known account information. In some embodiments, the service provider may identify information associated with the account that is verifiable. For example, the service provider may determine that the address supplied by the account holder is legitimate based on, for example, public records or other resources. In some embodiments, the account may be associated with a credit card used for purchases. If the credit card has been used in the past for transactions that were not later disputed, then the credit card billing address may be considered legitimate by the service provider. In this example, a metadata indicating a geo-location may be converted into an address to determine whether the media file was created close to a known address of the account holder. Alternatively, the address of record may be converted into global positioning system (GPS) coordinates to be compared to the location metadata.

Another example verification logic may include logic for comparing a received media file to media files provided by third party entities. For example, a received media file may be compared to similar media files located on a social network or other third party website. In this example, the service provider may determine a trust level for a third party site based on an amount of time that the website has been in operation as well as operational practices of that site. For example, if an account holder also maintains an account with a social networking site, then the service provider may determine a trust level for the social networking account based on how long it has been open and whether the social networking site has a reputation for removing fraudulent accounts. In some embodiments, a message posted using the social networking site account may be used to verify the account with the service provider. For example, the account holder may post "#verifymyserviceprovideraccount" via the social networking site. In some embodiments, the account holder may publish the submitted media file on the social networking site. The submitted media file may then be compared to the one published on the social networking site to determine that the account holder is actually related to the social networking site account. Upon receiving this notification, the verification logic may provide a confidence level based on the trust level of the social networking account.

Each verification logic used by the verification module 310 may provide a different confidence value based on the results of that verification logic. These different confidence values may be combined into a total confidence level. Furthermore, each different confidence level may be given a different weight or counted differently when being combined based on the verification logic used to assess it. For example, a verification logic that indicates the media file itself is likely forged, as determined by comparing a creation date of the media file 302 to a code generation date, may have a much greater effect on the total confidence level than another verification logic. In some embodiments, each verification logic may be assigned a different weight or bias, such that the resulting confidence value will be given the assigned weight. In some embodiments, each verification logic may be weighted based on a response or outcome of the verification logic. For example, a verification logic that results in a large number of users providing input related to the media file may be weighted more heavily than a verification logic that results in a small number of users providing input related to the media file. In another example, a verification logic that utilizes image comparisons to identify the account holder may be granted weight in proportion to a number of images available for comparison. More particularly, if there are very few images in an image database related to an account holder, then a confidence value resulting from an image comparison logic may have less weight than if there were many images related to the account holder. Some confidence levels generated using a particular verification logic may have only a negative or positive effect on the total confidence level. For example, if a media file was generated at a location that happens to coincide with a known address for the account holder, then the total confidence level may be increased. However, if the media file was generated at a location that does not coincide with a known address for the account holder, then the total confidence level may not be affected.

In some embodiments, the service provider may receive an indication after an account has been verified that the account holder is not who they claim to be. For example, a person familiar with the claimed account holder may challenge the verification of the account. In this scenario, the service provider may attempt to re-verify the account. In some embodiments, the service provider may identify one or more media files associated with the account to be re-verified. The one or more media files may include the originally verified media file as well as any other media file related to the account (e.g., uploaded images linked to the account). The media files may be subjected to the same verification processes used to verify the account initially or additional verification processes. In some embodiments, the account will remain verified until the re-verification process has been completed. For example, the account may retain its verified status while the verification process is being completed. The confidence level associated with the account may be updated based on one or more confidence values resulting from the re-verification. Upon determining that the confidence level associated with the account is below a minimum confidence threshold, the verified status may be removed from the account. In some embodiments, the account holder may not be notified that the account is being re-verified.

It should be noted that the described process may be performed automatically, or without human intervention on behalf of the service provider. For example, upon receiving a request for verification of an account, the service provider may generate a code, transmit the code to a contact information associated with the account, and store the code in relation to the account. The service provider may then utilize one or more algorithms to determine a minimum confidence threshold to be associated with the account. Once the media file is received by the service provider, it may be submitted automatically to a set of verification logics. In some embodiments, the media file may be submitted to multiple verification logics at the same time. In some embodiments, the media file may be sequentially submitted to a plurality of verification logics (submitted to one verification logic after another). The service provider may constantly monitor the total confidence level, and may verify the account upon the confidence level breaching the determined minimum confidence threshold. As stated, this entire process may occur independent of human intervention on behalf of the service provider.

By way of illustrative example, consider a scenario in which a user wishes to create an account with a service provider for, and verify that he is, George Takei. In this scenario, Mr. Takei may open an account with the service provider and request a code for verification. The code, after being generated and linked to the newly created account, may then be sent to Mr. Takei. By way of illustration, Mr. Takei may take a photo of himself with the code displayed somewhere in the photo. The photo may then be uploaded to the service provider for verification. The service provider, upon receiving the photo, may determine that the photo is related to Mr. Takei's account based on detecting the code within the image. The service provider may also determine, based on a number of results returned via an internet search, that Mr. Takei is famous. For example, a level of fame may be determined for Mr. Takei that is proportional to a number of internet search results that result from an internet search related to him. The service provider may subsequently calculate a corresponding minimum confidence level for Mr. Takei, which may be higher than that of other accounts based on his fame and the fact that the account is newly created.

Once Mr. Takei's newly created account is linked to the photo, the photo may be submitted to multiple verification logics. For example, the photo may be sent to fans of Mr. Takei (or fans of his work) so that they are able to verify that the individual in the photo is likely Mr. Takei. In this example, the recipients of the photo may vote on whether or not they believe the individual to be Mr. Takei. Additionally, the photo may be uploaded to a website associated with the newly created account (having a pending verification status), which may be opened to the public for viewing. In this case, visitors to the website may be given the opportunity, over a specified time frame, to indicate whether or not they believe the individual to be Mr. Takei. In addition, the photo may be compared to a number of images that are known to be of Mr. Takei (e.g., images located within a secure database by querying Mr. Takei, etc.). For example, the service provider may run facial recognition algorithms on Mr. Takei's face in the submitted photo as well as his face in the known images to determine whether there is a match. In this illustrative scenario, a confidence level may be computed for each of the verification logics used and may be summed, or otherwise combined, into a total confidence level. The total confidence level may then be compared to the determined minimum confidence threshold. If the total confidence level is greater than the minimum confidence threshold, then the service provider may determine that Mr. Takei's account is now a verified account.

By way of further illustration, consider a further scenario in which Mr. Takei's publisher later contacts the service provider to indicate that the account holder is not Mr. Takei. In this scenario, the service provider may initiate a re-verification process. The service provider may identify one or more photos (or other media files) that the account holder has uploaded to the account and send those photos through the verification process to determine a confidence level associated with those photos. As described above, the account holder may not be notified that his authenticity has been called into question and the account may retain its verified status while the verification process is being run. The total confidence level may be updated based on one or more confidence values resulting from the verification logics used in the re-verification process. In this scenario, if the total confidence level falls below the minimum confidence threshold, then the verified status may be removed from Mr. Takei's account.

Figure 4:
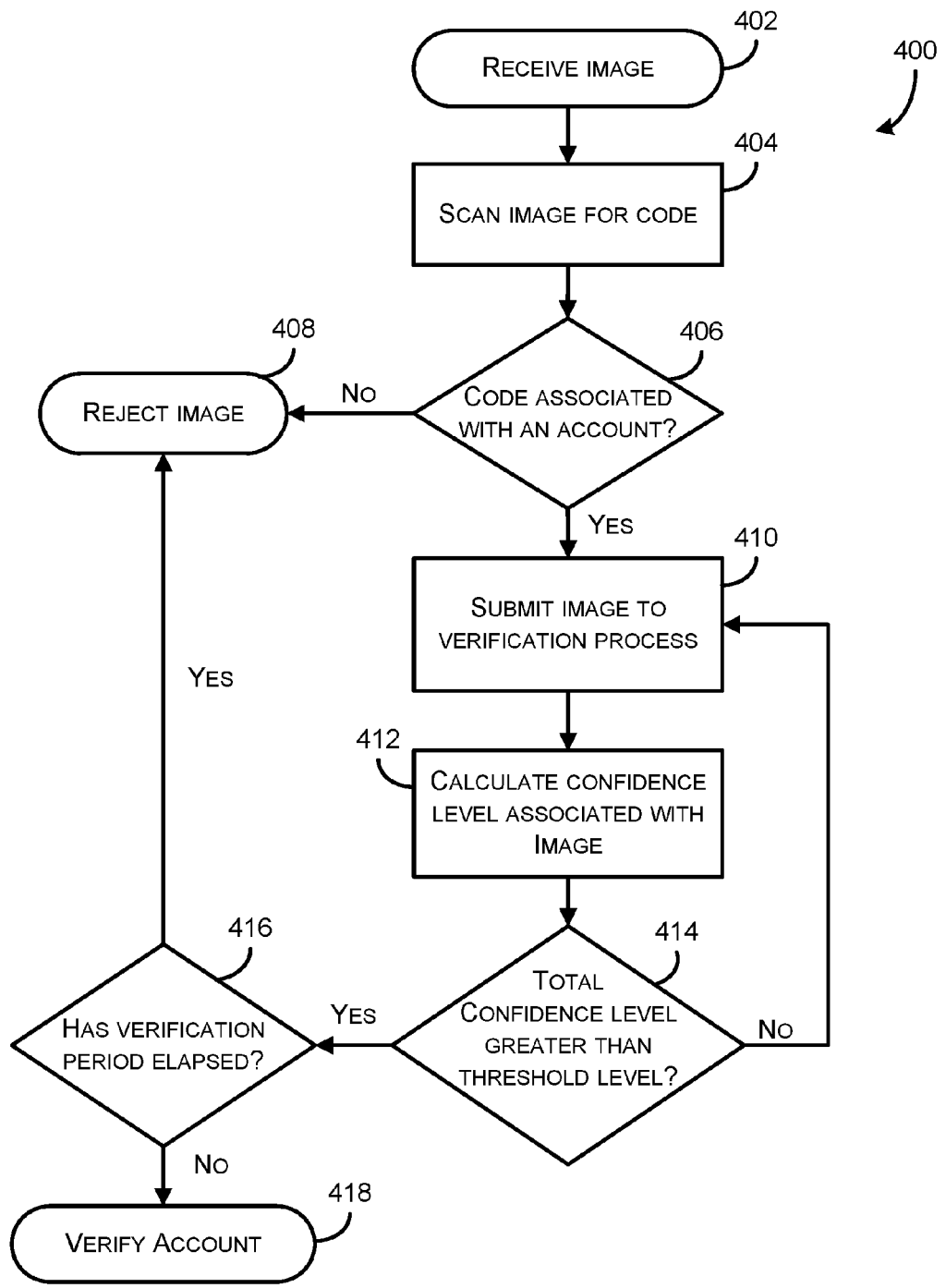
FIG. 4 depicts an illustrative flow chart demonstrating an example authentication platform for verifying an account in accordance with at least some embodiments.

FIG. 4 depicts an illustrative flow chart demonstrating an example authentication platform for verifying an account in accordance with at least some embodiments. The process 400 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 400 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 400 of FIG. 4 may be performed by at least the one or more service providers 206 shown in FIG. 2. The code may be stored on a computer-readable storage medium, for example, in the form of a computer program including a plurality of instructions executable by one or more processors. The computer-readable storage medium may be non-transitory. Although process 400 is described with respect to an image, it should be noted that the process 400 could be applied to any suitable type of media file.

Process 400 may begin at 402, when an image is received by the service provider. In some embodiments, the image may be received to an email address. In some embodiments, the image may be uploaded to a website. In some embodiments, the image may be received from a mobile device. Once the image has been received, it may be scanned using one or more image processing techniques to identify a code from the image at 404. In some embodiments, the code may be located in a metadata associated with the image. The code may be a series of alphanumeric characters, a machine readable code, a symbol or pictogram, or any other suitable means of identifying an account.

Once the code has been identified, it may be compared to stored code information to identify an account associated with it at 406. In some embodiments, a relationship between the received image and the identified account may be stored in memory (e.g., within a database table). If the image has no identifiable code, or the identified code is not associated with an account, then the image may be rejected at 408. Otherwise, the image may be submitted to a verification process at 410.

The verification process may be configured to use one or more techniques to determine whether the account holder is who he or she claims to be. To do this, the verification process may be configured to calculate a confidence level associated with the image at 412. For example, the verification process may be configured to determine whether the image is authentic, whether the image includes the account holder, whether the image was submitted by the account holder, and/or any other suitable factor related to the authenticity of an account. In some embodiments, a confidence level generated by a verification process may be negative.

Upon completion of the verification process (or at least partial completion of the verification process), the confidence level generated may be added to, or otherwise combined with, a total confidence level associated with the image and/or the account. The total confidence level may then be compared to a threshold confidence level to determine whether the account is to be verified at 414. In some embodiments, if the total confidence level is less than the threshold confidence level, the process 400 may return to 410 and submit the image to another verification process. In some embodiments, the process 400 may resubmit the image to a verification process that has already been performed. For example, where the verification process is a submission of the image to a set of users for verification, a resubmission to this verification process may result in a different set of users being provided with the image for verification. In some embodiments, the image may be submitted to a series of verification processes in this manner. The order of the verification processes in the series of verification processes (as well as which verification processes are included in the series of verification processes) may be predetermined, random, or based on determined verification need. For example, if the account is determined to be related to a famous individual, then there is a higher likelihood of an unauthentic image being submitted. In this scenario, the process 400 may determine that there is a greater need to verify the authenticity of the image.

In some embodiments, a process 400 may determine whether the confidence level associated with the image has exceeded the minimum confidence threshold before a verification period has elapsed at 416. In some embodiments, if the process determines that the confidence level associated with the media file has not exceeded the confidence threshold before the verification period has elapsed, then the account verification process may be failed. In some embodiments, the image may be rejected. In some embodiments, the account may be flagged as a potentially fraudulent account. In some embodiments, a verification period may be a period of time during which the media file may be subject to the one or more verification processes. In some embodiments, a verification period may be a maximum amount of time within which to verify the media file. In some embodiments, a verification period may be a number of times to which the media file may be subjected to one or more verification processes. In some embodiments, the verification period may be determined based on the set of verification processes to which the media file has been subjected. For example, the verification period may be determined based on the types of verification processes being used.

If the total confidence level is greater than the threshold confidence level, and if a verification period has not elapsed, the process 400 may determine that the account is verified at 418. In this scenario, the service provider may display an indication that the account is verified when other users view information related to the account. This may provide the users with an increased confidence in the account holder.

Figure 5:
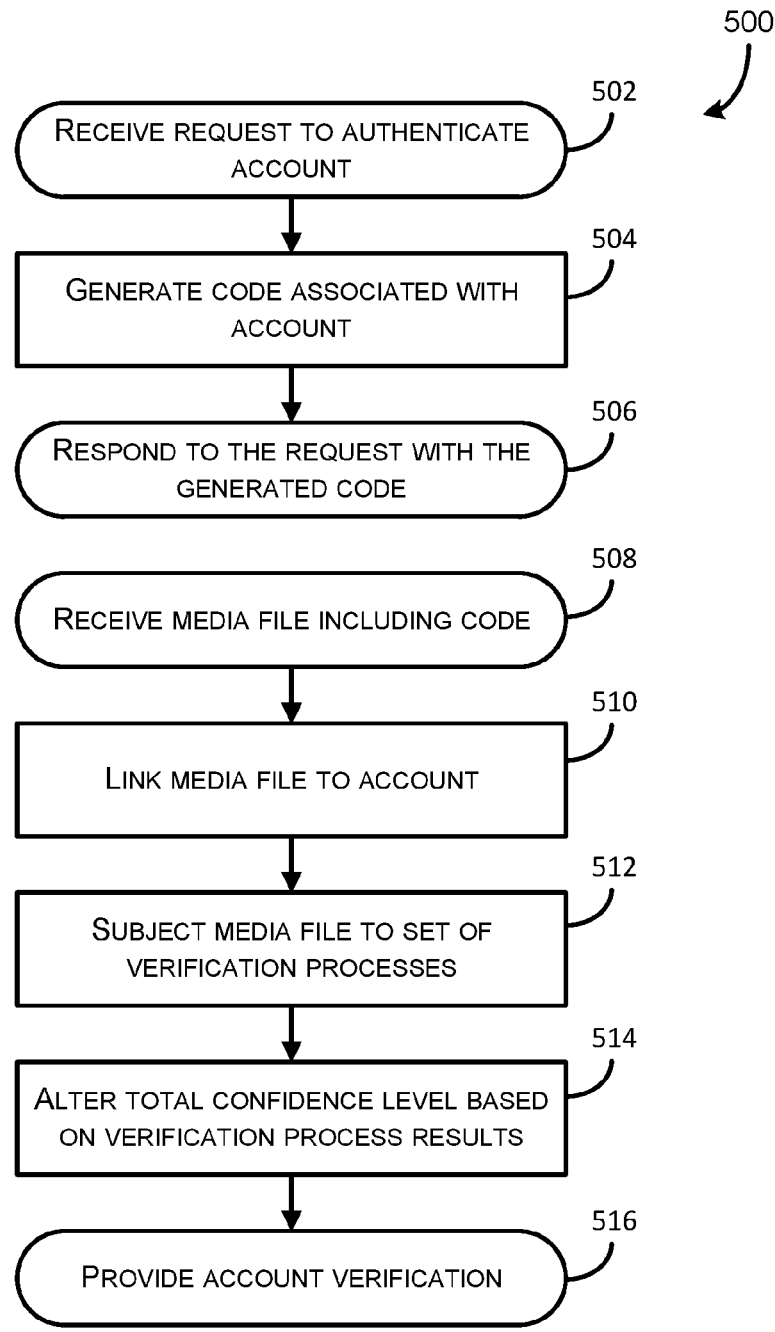
FIG. 5 depicts a process for providing automated account verification using content of a media file in accordance with at least some embodiments.

FIG. 5 depicts a process for providing automated account verification using content of a media file in accordance with at least some embodiments. In at least some embodiments, the process 500 of FIG. 5 may be performed by at least the one or more service providers 206 shown in FIG. 2.

Process 500 may begin at 502, when a request is received to authenticate an account. In some embodiments, the account may be a user account maintained by the service provider. In some embodiments, the account may be protected by a user name and password. For example, in order to access the account, a user may be required to log into a website by correctly entering the username and password. In some embodiments, the account may be associated with payment accounts (e.g., credit card numbers, tokens, e-wallet accounts, or any other type of payment information), personal information, demographic information, or any other information related to a user that may be maintained by the service provider. Upon receiving the request to authenticate the account, the service provider may generate a code to be associated with the account at 504. In some embodiments, the code may be a unique series of alphanumeric characters. For example, the code may include a timestamp and a designator (e.g., 01-01-2001-0012). In some embodiments, the code may be a randomly generated number or sequence. In some embodiments, the code may be embedded in a machine readable code. Once the code has been generated, it may be provided to the requestor at 506. In some embodiments, the code may be displayed on a network page (website), from which it may be printed or otherwise captured. In some embodiments, the code may be sent to an email address associated with the account. In some embodiments, the code may be transmitted to a user device associated with the account.

At 508, a media file may be received by the service provider. The service provider may analyze the received media file to identify the code associated with the media file. In some embodiments, the code may be embedded in metadata attached to the media file. For example, the service provider may process the metadata to identify the code stored within it. In some embodiments, the code may be embedded in a machine readable code depicted in content stored within the media file. For example, where the media file is an image file, the service provider may use an image processing technique to identify a machine readable code depicted within the image file. Once the code has been identified, the service provider may determine an account that the code is associated with. In some embodiments, the service provider may query a database of account and code relationships to identify the account that is to be authenticated. Once the account has been identified, it may be linked to the media file at 510. For example, the service provider may store the media file with an indication that it is related to the media file.

The media file may be subjected to a set of verification processes at 512. In some embodiments, the particular verification processes included in the set of verification processes may be predetermined. In some embodiments, the particular verification processes included in the set of verification processes may be determined based on the type of media file received, a minimum confidence threshold associated with the account, a method in which the media file was submitted/received, and/or based on any other suitable factor. In some embodiments, the verification processes included in the set of verification processes may be selected by the user that submitted the media file.

Each verification process that the media file is subjected to may alter a total confidence level associated with the media file and/or account at 514 based on the results of that verification process. Each verification process may have a positive or negative affect on the total confidence level. For example, the total confidence level may be altered each time that a user votes on whether or not a person depicted in an image file is the claimed account holder. Upon determining that the total confidence level has met or exceeded the minimum confidence threshold, the account may be provided with a verification. For example, the account may be marked as "verified" in one or more databases.

Figure 6:
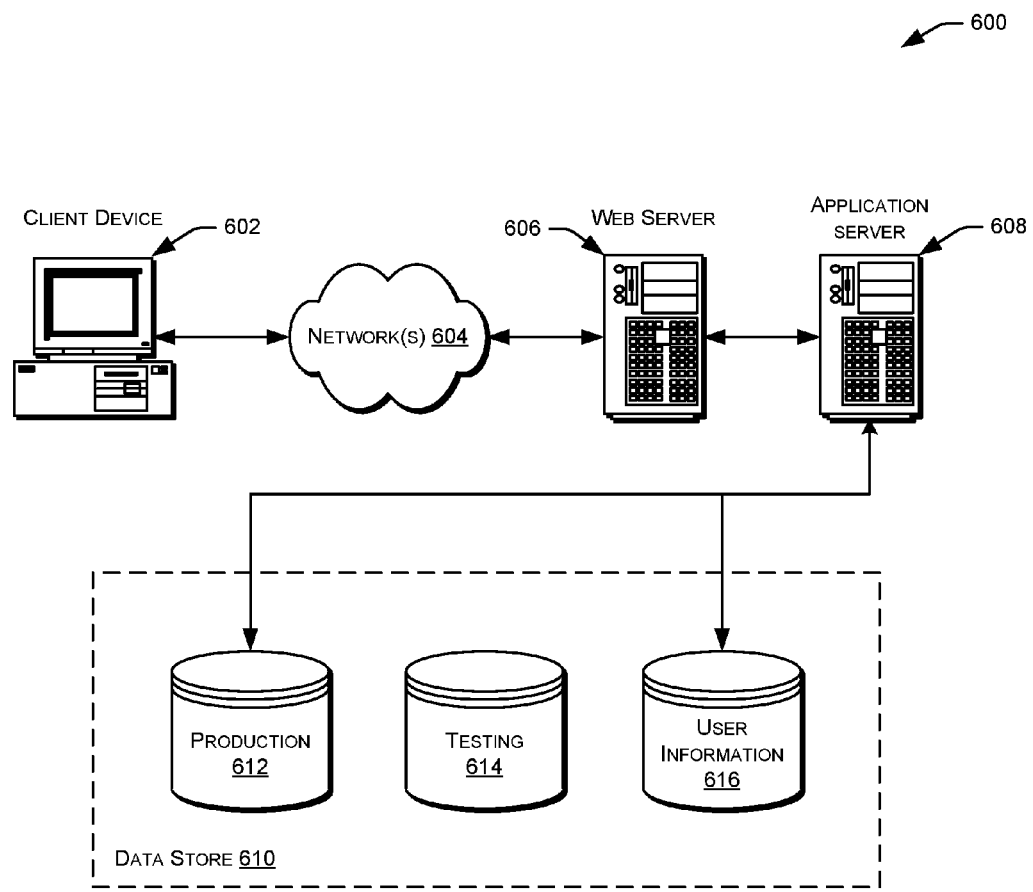
FIG. 6 illustrates an environment in which various embodiments can be implemented.

FIG. 6 illustrates aspects of an example environment 600 for implementing aspects in accordance with various embodiments. As will be appreciated, although a Web-based environment is used for purposes of explanation, different environments may be used, as appropriate, to implement various embodiments. The environment includes an electronic client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a request to authenticate an account maintained by a service provider;
   generating a code to be associated with the account;
   responding to the received request with the generated code;
   receiving an image file, the image file including the generated code;
   upon detecting the generated code within the image file, linking the image file to the account;
   while a total confidence level associated with the image file is less than a threshold confidence level, and within a verification period, subjecting the image file to a set of verification processes performed by a community based platform by receiving input from a plurality of users of the community based platform that includes an indication of an authenticity of an account holder associated with the account within the image file, wherein the plurality of users are determined based on being associated with a verified account or are determined based on an identified familiarity with the account holder;
   updating the total confidence level based at least in part on a result of each verification process in the set of verification processes; and
   providing, upon determining that the total confidence level associated with the image file is greater than or equal to the threshold confidence level, an account authentication.

2. The computer-implemented method of claim 1, wherein the method is performed without human intervention on behalf of the service provider.

3. The computer-implemented method of claim 1, wherein the account authentication is an indication that an identity of a user associated with the account is verified.

4. The computer-implemented method of claim 1, wherein linking the image file to the account based on the generated code comprises:
   identifying the generated code within the image file using one or more image processing techniques;
   querying the account in a code database based at least in part on the identified code; and
   storing a relationship between the identified code and the account.

5. A system, comprising:
   a processor; and
   a memory including instructions that, when executed with the processor, cause the system to, at least:
   receive a media file from a user;
   determine, upon detecting a code within the media file, an account to which the media file is related based on the code having been generated for that account
   identify one or more verification processes relevant to the media file;
   submit the media file to the one or more verification processes, wherein at least one verification process is performed by a community based platform by receiving input from a plurality of users of the community based platform that includes an indication of an authenticity of the user associated with the account, wherein the plurality of users is either associated with a verified account or is determined based on an identified familiarity with the user;

generate one or more confidence values associated with the media file, each of the one or more confidence values resulting from a verification process of the one or more verification processes;

determine a total confidence level based at least in part on the generated one or more confidence values;

determine, upon detecting that the media file has been processed by each of the one or more verification processes, whether the total confidence level satisfies a confidence criterion; and verify the account upon determining that the total confidence level satisfies the confidence criterion.

6. The system of claim 5, wherein the one or more verification processes relevant to the media file is identified based at least in part on a file type associated with the media file.

7. The system of claim 5, wherein the total confidence level is calculated based at least in part on a level of fame associated with an account holder related to the account.

8. The system of claim 7, wherein the level of fame is determined based at least in part on a number of search results obtained by conducting an internet search related to the account holder.

9. The system of claim 5, wherein the one or more verification processes includes a verification by a community based platform.

10. The system of claim 9, wherein the verification by the community based platform comprises receiving input from a plurality of users of the community based platform that includes an indication of an authenticity of an account holder associated with the account.

11. The system of claim 5, wherein the identified familiarity with the account holder is determined based on a purchase history for each of the plurality of users.

12. A non-transitory computer readable medium storing specific computer-executable instructions that, when executed by a processor, cause a computer system to at least:

receive a media file, the media file including an embedded code;

determine, based at least in part on detecting the embedded code within the media file, an account associated with the media file;

until a total confidence level associated with the media file meets a confidence criterion, subject the media file to a set of verification processes, the total confidence level being updated based at least in part on a result of the each of the verification processes to which the media file is subjected, wherein the total confidence level is a sum of confidence values generated via each of the verification processes of the set of verification processes, and wherein each of the confidence values generated via each of the verification processes of the set of verification processes is weighted according to a weight assigned to the verification process; and authenticate the account upon determining that the total confidence level has met a confidence criterion before a verification period has elapsed.

13. The computer readable medium of claim 12, wherein the media file is an image file and the embedded code is a machine readable code depicted in the image file.

14. The computer readable medium of claim 12, wherein the verification period is determined based on the set of verification processes.

15. The computer readable medium of claim 12, wherein the instructions further cause the computer system to provide an indication that the account has failed verification upon determining that the total confidence level has not met the confidence criterion and the verification period has elapsed.

16. The computer readable medium of claim 12, wherein the set of verification techniques includes a verification of an authenticity of the media file.

* * * * *